United States Patent
Pignataro et al.

(10) Patent No.: US 12,047,235 B1
(45) Date of Patent: Jul. 23, 2024

(54) EXPLICIT OVER-POWER NOTIFICATION AND POWER-BASED THROTTLE ELIGIBLE BITS, PATH SELECTION, AND SELECTIVE DISCARD ACTIONS

(71) Applicant: Cisco Technology, Inc., San Jose, CA (US)

(72) Inventors: Carlos Pignataro, Cary, NC (US); Pascal Thubert, Roquefort les Pins (FR); Eric A. Voit, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/360,480

(22) Filed: Jul. 27, 2023

(51) Int. Cl.
| | |
|---|---|
| *H04L 12/28* | (2006.01) |
| *H04L 41/0833* | (2022.01) |
| *H04L 43/08* | (2022.01) |
| *H04W 72/02* | (2009.01) |
| *H04W 72/12* | (2023.01) |

(52) U.S. Cl.
CPC .......... *H04L 41/0833* (2013.01); *H04L 43/08* (2013.01)

(58) Field of Classification Search
CPC ..... H04L 41/0833; H04L 43/08; H04L 12/28; H04W 72/02; H04W 72/12; H04W 48/16
USPC ........................................................ 709/224
See application file for complete search history.

(56) References Cited

U.S. PATENT DOCUMENTS

| 8,111,649 B1 | 2/2012 | Agarwall et al. |
| 10,595,185 B1* | 3/2020 | Chen ..................... H04W 24/08 |
| 2013/0159548 A1 | 6/2013 | Vasseur et al. |
| 2014/0177483 A1* | 6/2014 | Jones .................... H04W 24/02 |
| | | 370/278 |
| 2014/0237118 A1 | 8/2014 | Matthews |
| 2019/0280962 A1 | 9/2019 | Michael et al. |
| 2019/0294018 A1* | 9/2019 | Shrivastava ........ H04L 12/2807 |
| 2020/0387041 A1* | 12/2020 | Shrivastava ............ G02F 1/161 |
| 2021/0243107 A1 | 8/2021 | Retana et al. |

* cited by examiner

*Primary Examiner* — Jude Jean Gilles
(74) *Attorney, Agent, or Firm* — Ravi Mohan; Rutan & Tucker, LLP

(57) ABSTRACT

Described herein are devices, systems, methods, and processes for managing power congestion in multi-path routing systems. Indications may be similar to the ECN, and may be used in network headers, including headers for IPv6, SRv6, NSH, or other tunneling protocols. The indications, namely EOPN, PTE, and ECMP-exclude, can provide a mechanism for managing network power consumption and controlling ECMP routing based on flow priority and characteristics. The power budget can be dynamically adjusted based on the current power source mix, which may help to achieve sustainability goals. Hashing optimizations and signaling can be utilized to manage network power congestion and bandwidth-normalized power efficiency availability. A process may be implemented to ensure there is sufficient capacity to serve the expected traffic for different next-hop paths. Additionally, the ECN can be used to quickly react to congestion, bring capacity back online, and maintain optimal network performance, even in the absence of congestion.

20 Claims, 10 Drawing Sheets

EXPLICIT OVER-POWER NOTIFICATION AND POWER-BASED THROTTLE ELIGIBLE BITS, PATH SELECTION, AND SELECTIVE DISCARD ACTIONS

The present disclosure relates to network routing. More particularly, the present disclosure relates to managing power/energy usage in the network routing process.

BACKGROUND

Network routing, particularly equal-cost multi-path routing (ECMP), is a strategy where packet forwarding to a single destination can occur over multiple best paths with equal routing priority. The strategy can substantially increase bandwidth by load-balancing traffic over multiple paths. However, deploying it in practice can present significant challenges, particularly when it comes to managing power congestion.

Explicit congestion notification (ECN) is an extension to the internet protocol (IP) and to the transmission control protocol (TCP) that allows end-to-end notification of network congestion without dropping packets. Conventionally, TCP/IP networks signal congestion by dropping packets. When ECN is successfully negotiated, an ECN-aware router may set a mark in the IP header instead of dropping a packet in order to signal impending congestion. The receiver of the packet echoes the congestion indication to the sender, which reduces its transmission rate as if it detected a dropped packet.

There may be limitations to this approach when it comes to managing network power usage. For instance, there is presently no way to communicate back upstream to either the originator or upstream network devices when an agreed power budget is exceeded. This can lead to inefficiencies and increased energy consumption in the network. Furthermore, the current solutions do not provide a way to dynamically adjust the network based on power usage and network conditions.

SUMMARY OF THE DISCLOSURE

Systems and methods for managing power/energy usage in the network routing process in accordance with embodiments of the disclosure are described herein. In some embodiments, a network node includes a processor, at least one network interface controller configured to provide access to a network, and a memory communicatively coupled to the processor, wherein the memory includes a sustainability-aware networking logic that is configured to receive a data packet, the data packet being originated from a first endpoint node. The logic may further be configured to determine whether a power measurement for at least a portion of the network exceeds a predetermined power budget, mark the data packet with an explicit over-power notification (EOPN) indication in response to determining that the power measurement exceeds the predetermined power budget, and forward the marked data packet to a next hop in the network.

In some embodiments, the EOPN indication includes an EOPN bit, and the EOPN bit is included in a header of the marked data packet.

In some embodiments, the sustainability-aware networking logic is further configured to receive at least one subsequent data packet, and wherein the at least one subsequent data packet is originated from the first endpoint node, and the data packet and the at least one subsequent data packet are associated with a same flow.

In some embodiments, the at least one subsequent data packet includes a power-based throttle eligible (PTE) indication, and wherein the sustainability-aware networking logic is further configured to throttle the at least one subsequent data packet in forwarding the at least one subsequent data packet based on the PTE indication.

In some embodiments, the PTE indication includes a PTE bit included in a header of the at least one subsequent data packet.

In some embodiments, the at least one subsequent data packet includes an equal-cost multi-path routing (ECMP)-exclude indication, and wherein the sustainability-aware networking logic is further configured to forward, based on the ECMP-exclude indication, the at least one subsequent data packet to a first next hop that is different from a second next hop as determined based on an ECMP-associated hash function.

In some embodiments, the ECMP-exclude indication includes an ECMP-exclude bit included in a header of the at least one subsequent data packet.

In some embodiments, the at least one subsequent data packet includes at least one heartbeat data packet.

In some embodiments, the predetermined power budget is based at least in part on a present power source or power source mix.

In some embodiments, an endpoint node, includes a processor, at least one network interface controller configured to provide access to a network, and a memory communicatively coupled to the processor, wherein the memory includes a sustainability-aware networking logic. The logic is configured to transmit a data packet destined for a second endpoint node, receive an acknowledgement associated with the data packet from the second endpoint node, identify a flag in the acknowledgement, the flag being associated with an explicit over-power notification (EOPN) indication inserted into the data packet by the network. The logic is further configured to transmit at least one subsequent data packet destined for the second endpoint node based on the flag, the data packet and the at least one subsequent data packet being associated with a same flow.

In some embodiments, to transmit the at least one subsequent data packet, the sustainability-aware networking logic is further configured to throttle the at least one subsequent data packet.

In some embodiments, the at least one subsequent data packet includes at least one heartbeat data packet.

In some embodiments, the sustainability-aware networking logic is further configured to mark the at least one subsequent data packet with a power-related indication prior to transmitting the at least one subsequent data packet.

In some embodiments, the at least one subsequent data packet is marked with the power-related indication based at least in part on a characteristic of the same flow.

In some embodiments, the power-related indication includes at least one indication bit included in a header of the at least one subsequent data packet.

In some embodiments, the power-related indication includes a power-based throttle eligible (PTE) indication.

In some embodiments, the power-related indication includes an equal-cost multi-path routing (ECMP)-exclude indication.

In some embodiments, a network node, includes a processor, at least one network interface controller configured to provide access to a network, and a memory communicatively coupled to the processor, wherein the memory includes a routing logic. The logic is configured to receive a data packet to be forwarded downstream, the data packet being associated with a flow, determine a first next hop of the network for the data packet based on a first hash process, identify that there is insufficient network capacity associated with the first next hop for serving at least one expected subsequent data packet associated with the flow. The logic is further configured to determine a second next hop of the network for the data packet based on a second hash process different from the first hash process and forward the data packet to the second next hop.

In some embodiments, the routing logic is further configured to increase a trained link rate between the network node and the second next hop.

In some embodiments, the routing logic is further configured to energize at least one additional physical path between the network node and the second next hop.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
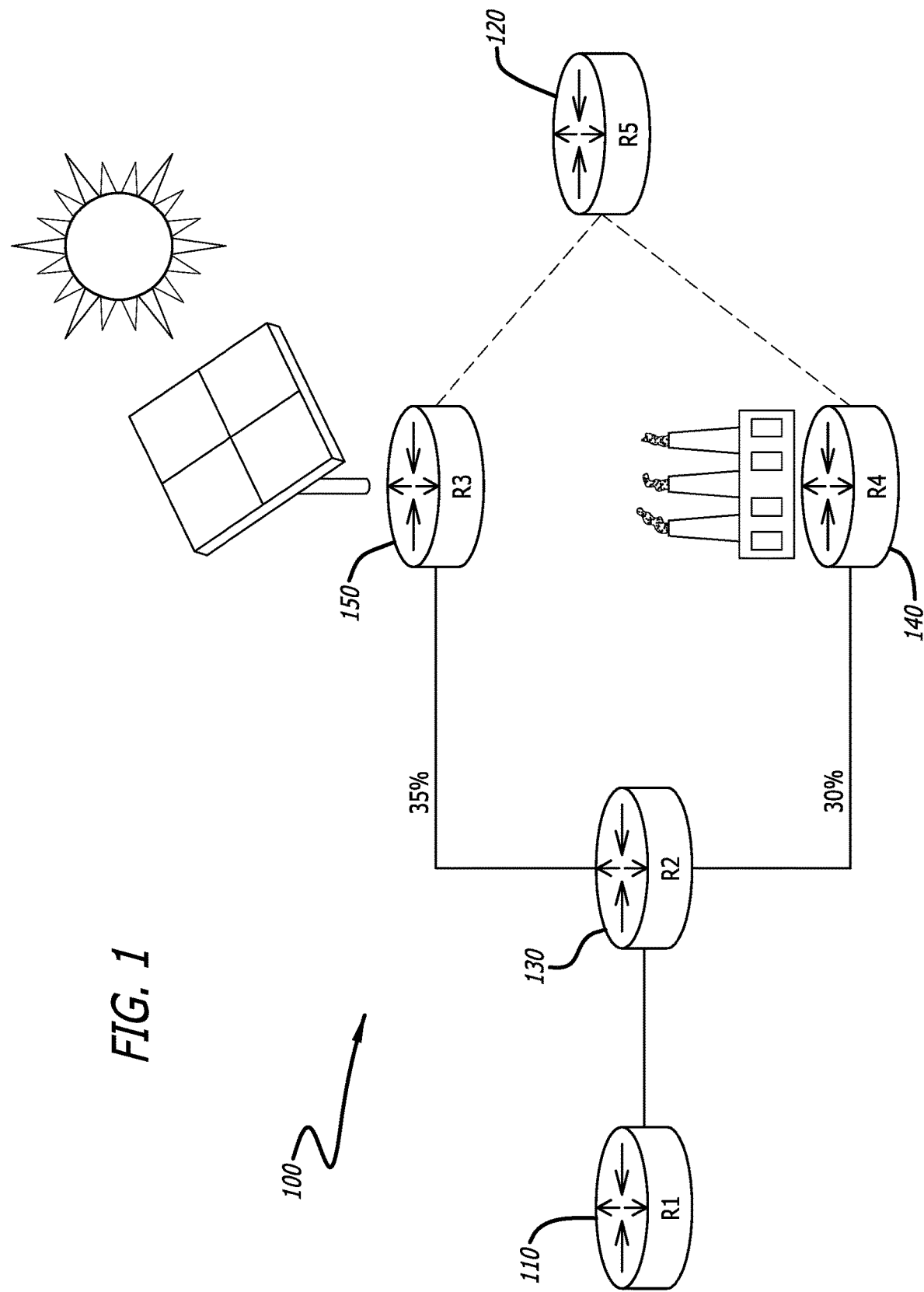
FIG. 1 is a schematic diagram of a network with network devices powered by various power source types in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that dynamically manage power congestion in multi-path routing systems. In many embodiments, data packets may be marked with indications in network headers, such as, but not limited to, headers for internet protocol version 6 (IPv6), segment routing over IPv6 (SRv6), network service header (NSH), and other tunneling protocols. The indications can include one or more of an explicit over-power notification (EOPN), a power-based throttle eligible (PTE) indication, and/or an equal-cost multi-path routing (ECMP)-exclude indication. In a number of embodiments, the EOPN may be used to control the use of ECMP based on energy consumption. Paths that are rated high-cost in terms of power consumption (e.g., when power usage exceeds the power budget when determined by one or more power measurements) can raise the EOPN and the transport may avoid such paths as if there were congestion. In particular, a network node can mark a data packet with an EOPN in response to detecting excessive network power usage. The receiver of the packet may set a flag based on the EOPN in the acknowledgement message provided back to the sender. Upon receiving the acknowledge message, the sender can then perform one or more power-related operations based on the flag to help the network reduce power usage.

In a variety of embodiments, a sender can throttle the flow or set the PTE indication (e.g., based on the flag) for subsequent packets of the flow if the flow, which may correspond to an application, is low priority or time insensitive. By way of a non-limiting example, the sender may reduce the flow to a heartbeat signal if the flow is time-insensitive in case of excessive network power usage. The regular transmission of flow data can resume when the network power usage eases. The PTE indication may indicate that a flow can be throttled for energy reasons, in which case the routers can set the congestion bit earlier for that flow, and the transport can throttle the flow more aggressively. This may enable the management of power usage at the application level.

In some embodiments, the power budget may be based on the current power source mix. By way of a non-limiting example, the power budget may be higher when there is more green energy in the mix (e.g., during daytime when there is more solar power in the supply) and lower when there is less green energy in the mix (e.g., when more fossil fuels are burned to supply the power). This can allow for dynamic adjustment of network operations based on available energy resources.

In more embodiments, a sender can set the ECMP-exclude indication (e.g., based on the flag) for subsequent packets of the flow if the flow can tolerate misordering (e.g., of data packets belonging to the flow) and/or have no/loose latency boundary. The ECMP-exclude indication may indicate to the ECMP handling component to select a next hop using a hash function (or another process) that excludes the next hop selected based on the normal hash function. By way of non-limiting examples, a fast path may utilize ternary content-addressable memory (TCAMs) (which may be associated with higher power usage) while a slower path may rely on vector packet processing (VPP) and software deep packet inspection (DPI) (which may be associated with lower power usage). Accordingly, the network may route such packets via lower power usage paths as appropriate based on the ECMP-exclude indication. This may enable the managing of traffic based on the power usage of different paths.

In additional embodiments, hashing optimizations and signaling can be utilized. A network node may recognize the congestion and signal the network (e.g., using the explicit congestion notification (ECN)) to make adjustment. Further, the hashes can be adjusted to spread traffic away from the next physical hop beyond which traffic is being dropped (e.g., due to congestion). In further embodiments, if there is not enough bandwidth, but it is possible to increase the bandwidth by increasing the trained link rate or energizing additional physical paths along a layer 2 (L2) or layer 3 (L3) path to the desired next hop, then these actions can be taken by the network node. In other words, the network may be dynamically adjusted based on bandwidth availability.

In still more embodiments, a sequential process may be utilized to ensure there is enough capacity to serve the expected traffic anticipated for the different next-hop paths. The process can include checking if there is sufficient downstream bandwidth available at the physical layer to meet the service level agreements (SLAs) with a change in hashed forwarding. In still further embodiments, if there is not enough bandwidth, but it is possible to increase the bandwidth by increasing the trained link rate or energizing additional physical paths along an L2 or L3 path to the desired next hop, then these actions can be taken by the network node. Once there is enough bandwidth, the hashes may be adjusted to spread traffic away from the next physical hop beyond which traffic is being dropped due to congestion. In still additional embodiments, the ECN can be utilized to wake up capacity upstream even if there is not congestion. This may allow the network to react quickly to congestion, bringing capacity quickly back on-line.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic diagram of a network 100 with network devices powered by various power source types in accordance with an embodiment of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," "power usage," and "power plant" when describing energy delivery and utilization, even though those skilled in the art will recognize that those elements are delivering or processing energy (specifically electricity) at a certain rate of power. Therefore, specific references to "power usage" may be interchangeable with "energy usage" as needed. References to these colloquial terms are utilized herein specifically to increase the ease of reading and are not meant to be limiting to specific power versus energy specifically.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modern power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various measurements, scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-10 as required to realize a particularly desired embodiment. Augmented protocols to carry out these described processes are described below.

Figure 2:
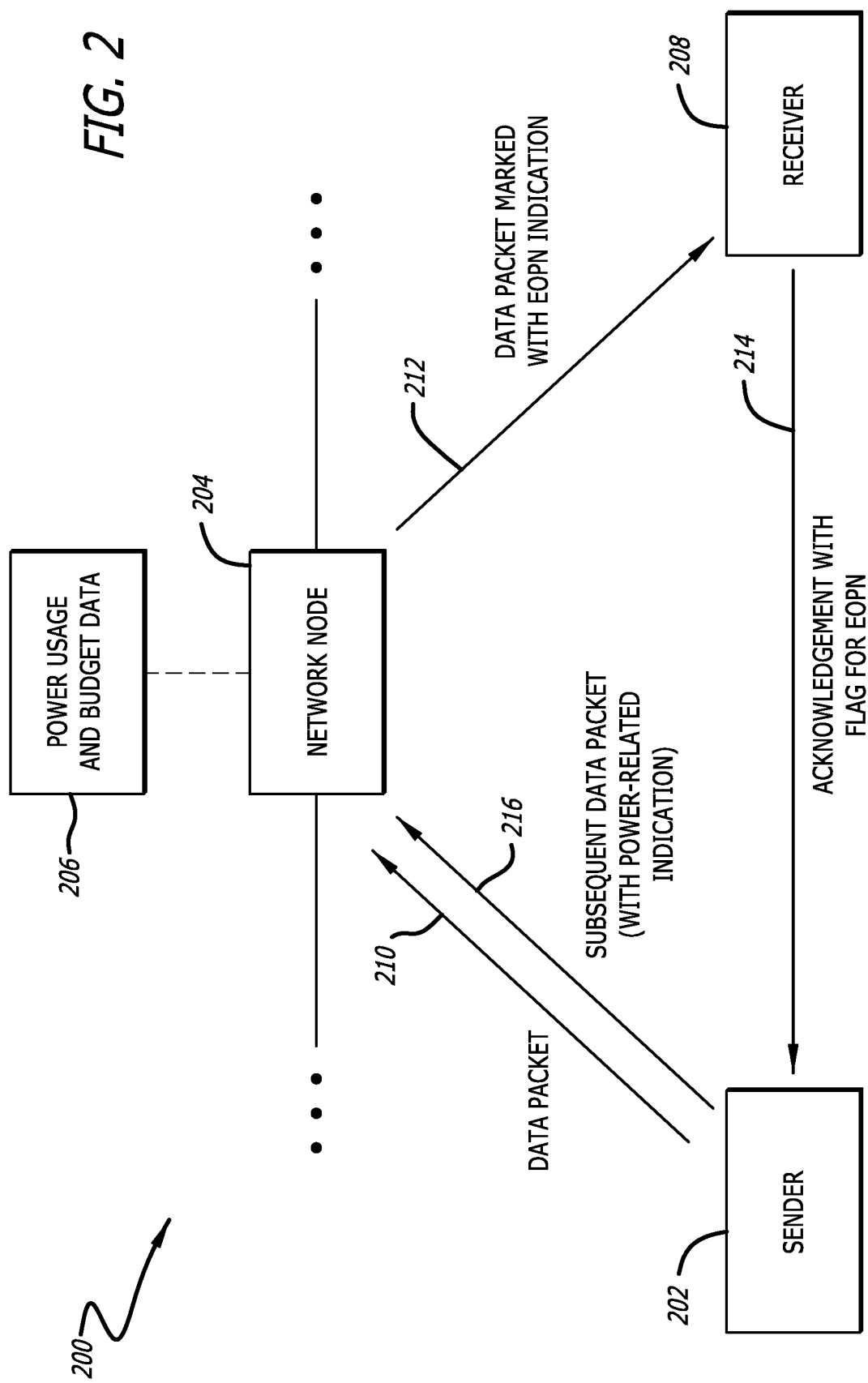
FIG. 2 is a diagram illustrating a network system managing power congestion using indications in accordance with various embodiments of the disclosure.

Referring to FIG. 2, a diagram 200 illustrating a network system managing power congestion using indications in accordance with various embodiments of the disclosure is shown. In many embodiments, a sender 202 may transmit a data packet 210 to a receiver 208. The data packet 210 can navigate through a network domain encompassing various network nodes, including the network node 204. In a number of embodiments, the network node 204 has access to power usage and budget data 206, enabling the network node 204 to identify an over-power condition. In a variety of embodiments, the over-power condition may refer to a situation where the power consumption exceeds the available power budget within the network domain or one or more particular paths of the network domain. In some embodiments, the available power budget may be variable depending on the current power source mix. By way of non-limiting examples, when there is more green energy (e.g., energy generated from lower carbon footprint/renewable sources) in the power supply, the available power budget may be higher; on the other hand, when there is less green energy and more non-green energy (brown energy) (e.g., energy generated from higher carbon footprint/non-renewable sources) in the power supply, the available power budget may be lower. Upon detecting such a condition, the network node 204 may mark the data packet with an EOPN (e.g., an EOPN bit in a header of the data packet, where the header may be for one of IPv6, SRv6, NSH, or other tunneling protocols) and forward the marked data packet 212 to the next hop in the network for delivery to the receiver 208. In more embodiments, upon receipt of the marked data packet 212, the receiver 208 can send an acknowledgement message 214 back to the sender 202. If the data packet is marked with EOPN, the receiver 208 may include a flag in the acknowledgement message 214, thereby alerting the sender 202 about the over-power condition in the network.

In additional embodiments, the sender 202 can respond to the over-power condition in various ways. By way of non-limiting examples, the sender 202 may throttle subsequent data packets corresponding to the same flow or mark subsequent data packets 216 with at least one power-related indication. In further embodiments, the sender 202 may mark subsequent data packets 216 with a PTE indication (e.g., a PTE bit in a header of the data packet, where the header may be for one of IPv6, SRv6, NSH, or other tunneling protocols), signaling to network nodes that it is acceptable to throttle these data packets (or throttle these data packets more aggressively) (or even to discard the data packets) in order to meet power consumption targets. By way of a non-limiting example, the sender 202 can mark data packets corresponding to a flow for a video call application with the PTE indication. Network nodes encountering such data packets may throttle them and reduce the overall data volume, especially in an over-power condition, leading to less power consumption in the network and the terminal. The effect of the throttling may be a degradation of the definition of color depth, sometimes imperceptible to the user. Accordingly, the higher video quality may be affordable when the available power budget is greater (e.g., when there is more green energy in the power supply), and the video quality may be degraded by the network when the available power budget is lower (e.g., when there is more green energy in the power supply). In still more embodiments, in general, the sender 202 may throttle the subsequent data packets or mark the subsequent data packets 216 with the PTE indication if the flow is non-critical, low priority and/or not time-sensitive (e.g., if the flow is for a data backup application).

In still further embodiments, the sender 202 may mark the subsequent data packets 216 with the ECMP-exclude indication (e.g., an ECMP-exclude bit in a header of the data packet, where the header may be for one of IPv6, SRv6, NSH, or other tunneling protocols). A network node performing ECMP handling may select a next hop for the ECMP-exclude indication-marked data packets using a hash function that excludes the next hop selected based on the normal hash function. By way of a non-limiting example, the load balancing function can be executed twice. First the normal next hop based on the normal hash function may be found, then the network node can exclude the normal next hop and select between the other possible next hops. Accordingly, if just one ECMP path is in the over-power condition (or congested), then the ECMP-exclude indication may allow the network nodes to reduce the traffic along the over-powered path. By way of a non-limiting example, data packets marked with ECMP-exclude indication may be rerouted by the network to a lower performance path that consumes less energy per unit of throughput (e.g., a fast path may utilize TCAMs whereas a slower path may rely on VPP and software DPI). In still additional embodiments, in general, the sender 202 may mark the subsequent data packets 216 with the ECMP-exclude indication if the flow can tolerate misordering (e.g., of data packets belonging to the flow) and/or have no or loose latency boundary (i.e., the flow is not real-time or deterministic). In some more embodiments, the sender 202 can mark data packets with one of the PTE indication or the ECMP-exclude indication, or may mark data packets with both the PTE indication and the ECMP-exclude indication.

Although a specific embodiment for a network system managing power congestion using indications is discussed with respect to FIG. 2, any of a variety of systems and/or processes may be utilized in accordance with embodiments of the disclosure. For example, the network node can be equipped with machine learning processes to predict power usage patterns and preemptively adjust the marking of data packets to prevent over-power conditions. The elements depicted in FIG. 2 may also be interchangeable with other elements of FIGS. 1 and 3-10 as required to realize a particularly desired embodiment.

Figure 3:
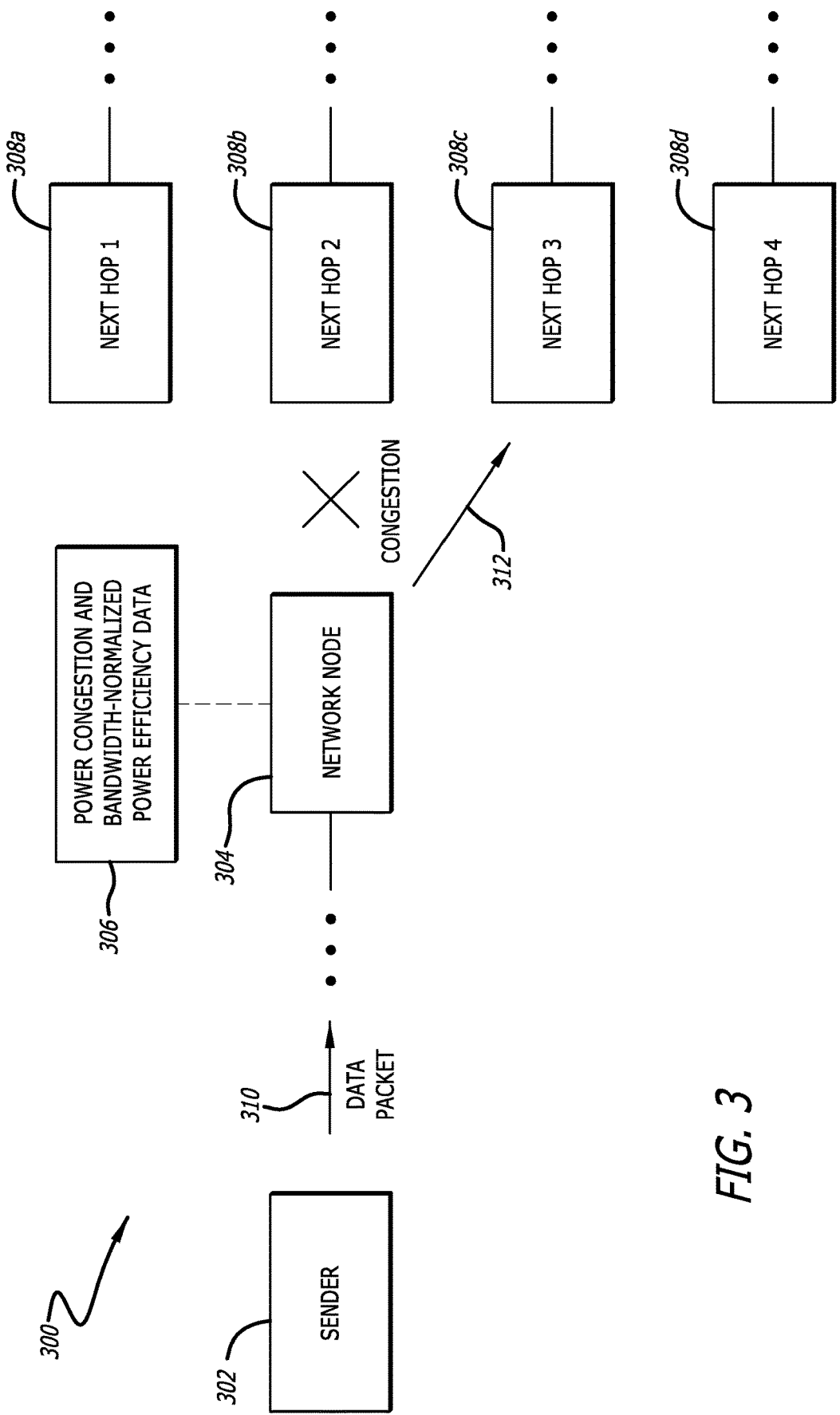
FIG. 3 is a diagram illustrates a network system managing power congestion and bandwidth-normalized power efficiency using hashing optimizations and signaling in accordance with various embodiments of the disclosure.

Referring to FIG. 3, a diagram 300 illustrates a network system managing power congestion and bandwidth-normalized power efficiency using hashing optimizations and signaling in accordance with various embodiments of the disclosure is shown. In many embodiments, a sender 302 may transmit a data packet 310 across a network. The network can include a network node 304, which may have access to power congestion and bandwidth-normalized power efficiency data 306. The network node 304 can use the power congestion and bandwidth-normalized power efficiency data 306 to manage the flow of data packets.

In a number of embodiments, the network node 304 may have the option to select from four possible next hops for the data packet 310: next hop 1 308a, next hop 2 308b, next hop 3 308c, and next hop 4 308d. The next hops can be the subsequent points in the network where the data packet can be forwarded. The selection of the next hop may typically be based on a standard hashing function, a process utilized in ECMP to distribute network traffic evenly across multiple paths. In general, ECMP can be a routing strategy that allows for the forwarding of packets along multiple paths of equal cost with the goal of balancing network load.

However, if the next hop 2 308b is experiencing power congestion (e.g., it is in an over-power condition, has a lower power efficiency, etc.), then the network node 304 may modify the hash function and instead select and transfer (indicated by arrow 312) to a next hop 3 308c. By way of non-limiting examples, the network node 304 can operate on a platform with multiple links involved in ECMP, unequal cost multi-path routing (UCMP), or other traffic distribution mechanisms. The platform can experience transient congestion downstream due to, e.g., downstream link de-energizing or other transient issues.

In a variety of embodiments, the network node 304 may dynamically energize alternative paths (e.g., when some network outage is predicted or anticipated for a specific route) and adjust the hashing process for new flows. The adjustment can allow the network node 304 to redirect a portion of the data flows down paths that traverse different hops from the one where packet loss was reported (e.g., due to a congestion). In some embodiments, if there is insufficient bandwidth (e.g., between the network node 304 and the next hop 3 308c, and/or further downstream) but it is possible to increase the bandwidth by raising the trained link rate, the network node 304 can speed up the links to increase the bandwidth. In more embodiments, if there is not enough bandwidth (e.g., between the network node 304 and the next hop 3 308c, and/or further downstream), but it is possible to energize additional physical paths along an L2 or L3 path to the desired next hop (e.g., the next hop 3 308c), the network node 304 may activate these additional physical paths.

Accordingly, in additional embodiments, the network node 304 can adjust the hashes to distribute traffic away from the next physical hop where traffic is being dropped (e.g., due to the congestion). This adjustment may be particularly useful when there is sufficient downstream bandwidth available at the physical layer to serve the SLAs with a change in hashed forwarding. In further embodiments, the network node 304 can use the ECN to signal the network to adjust for congestion. In particular, the ECN may allow end-to-end or core router-based notification of network congestion without dropping packets.

In still more embodiments, the network node 304 can adjust the hashing process for incremental new flows whose 5-tuples (e.g., source IP address, source port, destination IP address, destination port, and the protocol in use; a 5-tuple may uniquely identify a flow) (or equivalent) have not been seen before. By adjusting the hashing process, the network node 304 can change the way it distributes the new flows across the network. By way of non-limiting examples, the network node 304 can send the new flows down less congested paths, or paths that have more available bandwidth. The ability to dynamically adjust the distribution of network traffic based on the characteristics of the traffic itself may allow the network to more efficiently handle varying traffic loads and conditions.

In still further embodiments, the network node 304 can utilize affinity (i.e., a preference for certain paths over others) to drive traffic to fewer links within a path. The network node 304 can also address hysteresis (i.e., the current state being dependent on the past states) by having known rules for traffic hashing convergence to specific physical paths at different bandwidth levels. This approach may allow traffic to converge (gradually) back to an optimized set of links. In still additional embodiments, the network node 304 can propagate the ECN across multiple hops upstream, allowing the overall network to react quickly to congestion and bring capacity back online quickly and aggressively. On the other hand, when network capacity is to be removed (e.g., to reduce power consumption), the network may remove capacity conservatively.

Although a specific embodiment for a network system managing power congestion and bandwidth-normalized power efficiency using hashing optimizations and signaling suitable for carrying out the various steps, processes, methods, and operations described herein is discussed with respect to FIG. 3, any of a variety of systems and/or processes may be utilized in accordance with embodiments of the disclosure. For example, the network node can implement advanced traffic management strategies, such as, but not limited to, Quality of Service (QoS) policies, to prioritize certain types of traffic over others. The elements depicted in FIG. 3 may also be interchangeable with other elements of FIGS. 1, 2, and 4-10 as required to realize a particularly desired embodiment.

Figure 4:
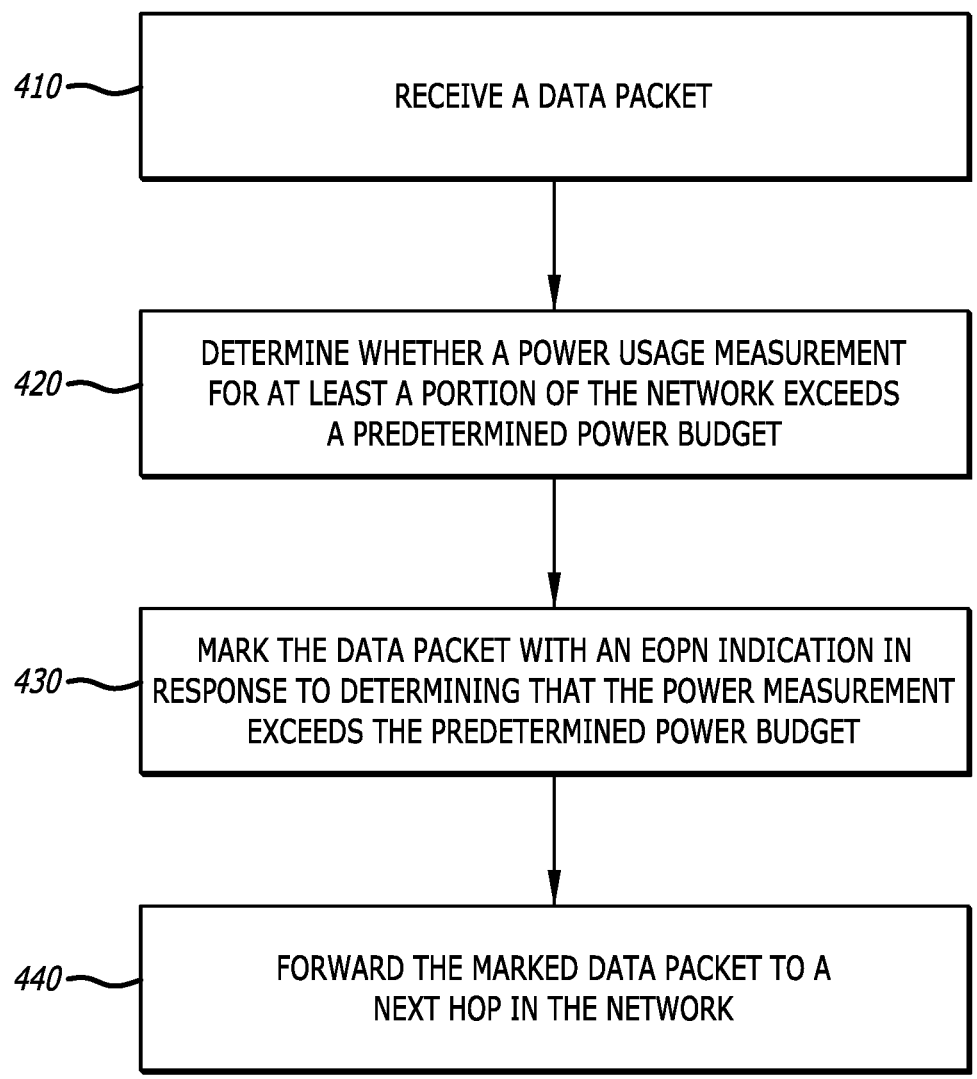
FIG. 4 is a flowchart showing a process for managing power usage in a network in accordance with various embodiments of the disclosure.

Referring to FIG. 4, a flowchart showing a process 400 for managing power usage in a network in accordance with various embodiments of the disclosure is shown. In many embodiments, the process 400 may receive a data packet (block 410). The data packet can be originated from a first endpoint node within the network. The data packet may contain various types of data, such as text, images, audio, video, or any combination thereof. The data packet can also be part of a larger data flow, which is a series of related data packets sent between two nodes in the network.

In a number of embodiments, the process 400 can determine whether a power measurement for at least a portion of the network exceeds a predetermined power budget (block 420). The determination may be based on various factors and/or measurements, such as the current power usage of the network, the maximum power capacity of the network, and the power usage patterns of the network. As those skilled in the art will recognize, power measurements can be taken in response to a request for the data or may be previously done and the related data available for processing. The power measurements may be configured to cover a large portion of the network or smaller portions, even individual nodes, etc. The predetermined power budget can be set based on various considerations, such as, but not limited to, the power capacity of the network, the power source mix, and the power consumption policies of the network. In some embodiments, the power budget may be dynamically generated and updated based on various inputs, periods, or other changes to the network.

In a variety of embodiments, the process 400 can mark the data packet with an EOPN indication in response to determining that the power usage exceeds the predetermined power budget (block 430). The EOPN indication may be a specific bit or set of bits in the header of the data packet. The EOPN indication can serve as a signal to the other network nodes in the network that the power usage of the network is exceeding the predetermined power budget.

In some embodiments, the process 400 can forward the marked data packet to a next hop in the network (block 440). The next hop may be any node in the network that is one step closer to the destination of the data packet. The process of forwarding the data packet can involve various steps, such as determining the best path for the data packet based on the current network conditions, modifying the data packet to include routing information, and transmitting the data packet to the next hop.

Although a specific embodiment for a process of managing power usage in a network suitable for carrying out the various steps, processes, methods, and operations described herein is discussed with respect to FIG. 4, any of a variety of systems and/or processes may be utilized in accordance with embodiments of the disclosure. For example, the network node can implement advanced power management strategies, such as dynamic power scaling, to adjust the power usage of the network based on the current network conditions and the power requirements of the data packets. The elements depicted in FIG. 4 may also be interchangeable with other elements of FIGS. 1-3 and 5-10 as required to realize a particularly desired embodiment.

Figure 5:
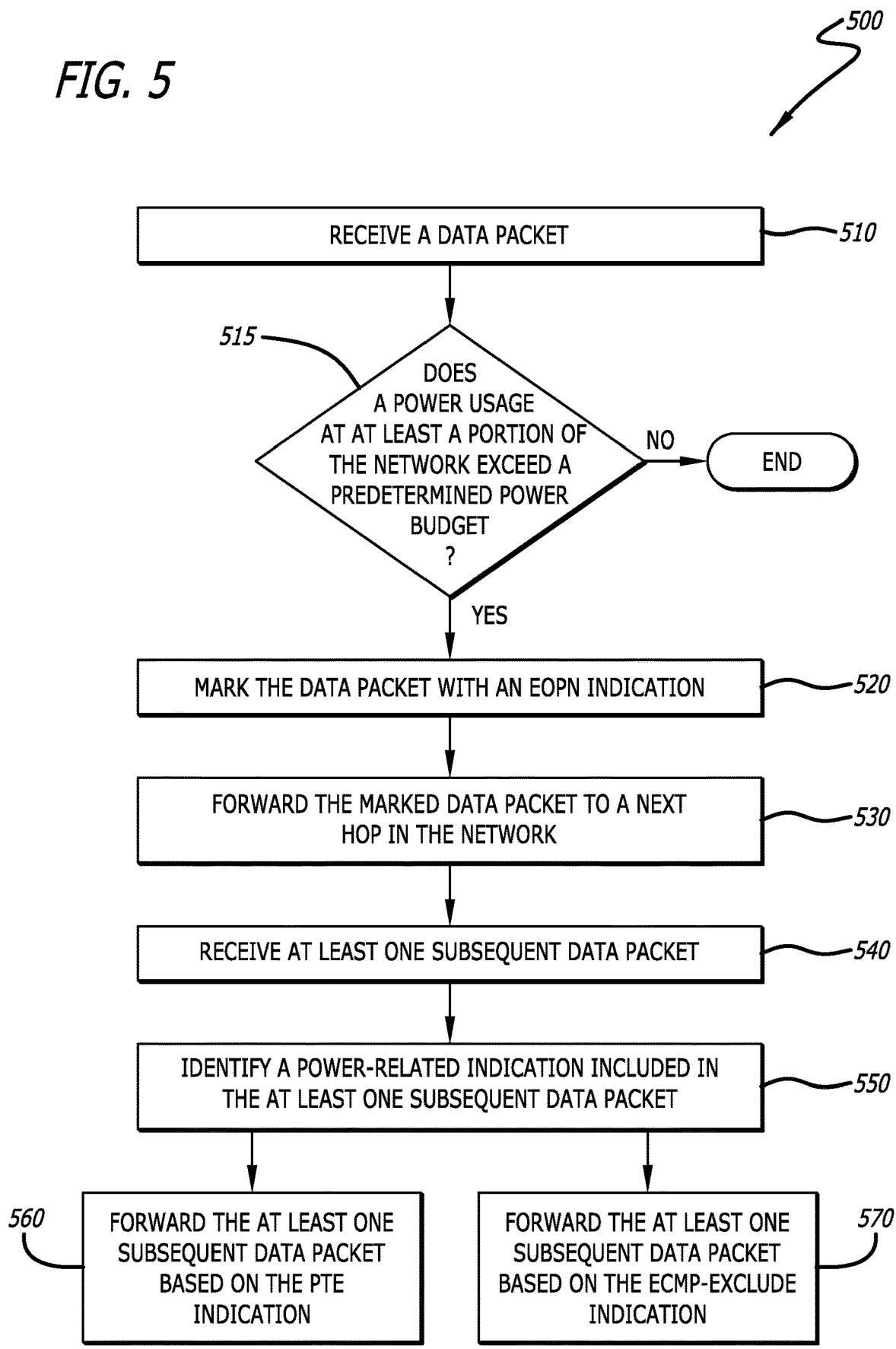
FIG. 5 is a flowchart showing a process for managing power usage and data packet forwarding in a network in accordance with various embodiments of the disclosure.

Referring to FIG. 5, a flowchart showing a process 500 for managing power usage and data packet forwarding in a network in accordance with various embodiments of the disclosure is shown. In many embodiments, the process 500 may receive a data packet (block 510). The data packet can be originated from a first endpoint node within the network. The data packet may contain various types of data, such as text, images, audio, video, or any combination thereof. The data packet can also be part of a larger data flow, which is a series of related data packets sent between two nodes in the network.

In a number of embodiments, the process 500 can determine if a power usage of at least a portion of the network exceeds a predetermined power budget (block 515). The determination may be based on various factors, such as the current power usage of the network, the maximum power capacity of the network, and the power usage patterns of the network. The predetermined power budget can be set based on various considerations, such as the power capacity of the network, the power source mix, and the power consumption policies of the network. In a variety of embodiments, in response to the power usage exceeding the predetermined power budget, the process 500 can mark the data packet with an EOPN indication. However, in some embodiments, when the power usage does not exceed the predetermined power budget, the process 500 can end, and the data packet can be forwarded to a next hop in the network as normal (e.g., without additional marking).

In more embodiments, the process 500 can mark the data packet with an EOPN indication in response to the power usage exceeding the predetermined power budget (block 520). The EOPN indication may be a specific bit or set of bits in the header of the data packet. The EOPN indication can serve as a signal to the other network nodes in the network that the power usage of the network is exceeding the predetermined power budget.

In additional embodiments, the process 500 can forward the marked data packet to a next hop in the network (block 530). The next hop may be any node in the network that is one step closer to the destination of the data packet. The process of forwarding the data packet can involve various steps, such as, but not limited to, determining the best path for the data packet based on the current network conditions, modifying the data packet to include routing information, and transmitting the data packet to the next hop.

In further embodiments, the process 500 may receive at least one subsequent data packet (block 540). The subsequent data packet can also be originated from the first endpoint node, and the data packet and the subsequent data packet may be associated with the same flow. The subsequent data packet can also contain a PTE indication and/or an ECMP-exclude indication.

In still more embodiments, the process 500 can identify a power-related indication included in the at least one subsequent data packet (block 550). This power-related indication may be a specific bit or set of bits in the header of the subsequent data packet. The power-related indication can include a PTE indication and/or an ECMP-exclude indication.

In still further embodiments, the process 500 can forward the at least one subsequent data packet based on the PTE indication (block 560). The PTE indication may serve as a signal to the network node that the subsequent data packet is eligible for throttling in forwarding based on power considerations. The throttling can be implemented in various ways, such as, but not limited to, reducing the transmission rate of the subsequent data packet, or delaying the transmission of the subsequent data packet.

In still additional embodiments, the process 500 can forward the at least one subsequent data packet based on the ECMP-exclude indication (block 570). The ECMP-exclude indication may serve as a signal to the network node to forward the subsequent data packet to a first next hop that is different from a second next hop as determined based on an ECMP-associated (standard) hash function. This can help to balance the load on the network and route the at least one subsequent data packet through a path that is not in the over-power condition (e.g., a slower path).

Although a specific embodiment for a process of managing power usage and data packet forwarding in a network suitable for carrying out the various steps, processes, methods, and operations described herein is discussed with respect to FIG. 5, any of a variety of systems and/or processes may be utilized in accordance with embodiments of the disclosure. For example, the network node can dynamically adjust the power budget based on real-time power source data, network conditions, and data packet characteristics. The elements depicted in FIG. 5 may also be interchangeable with other elements of FIGS. 1-4 and 6-10 as required to realize a particularly desired embodiment.

Figure 6:
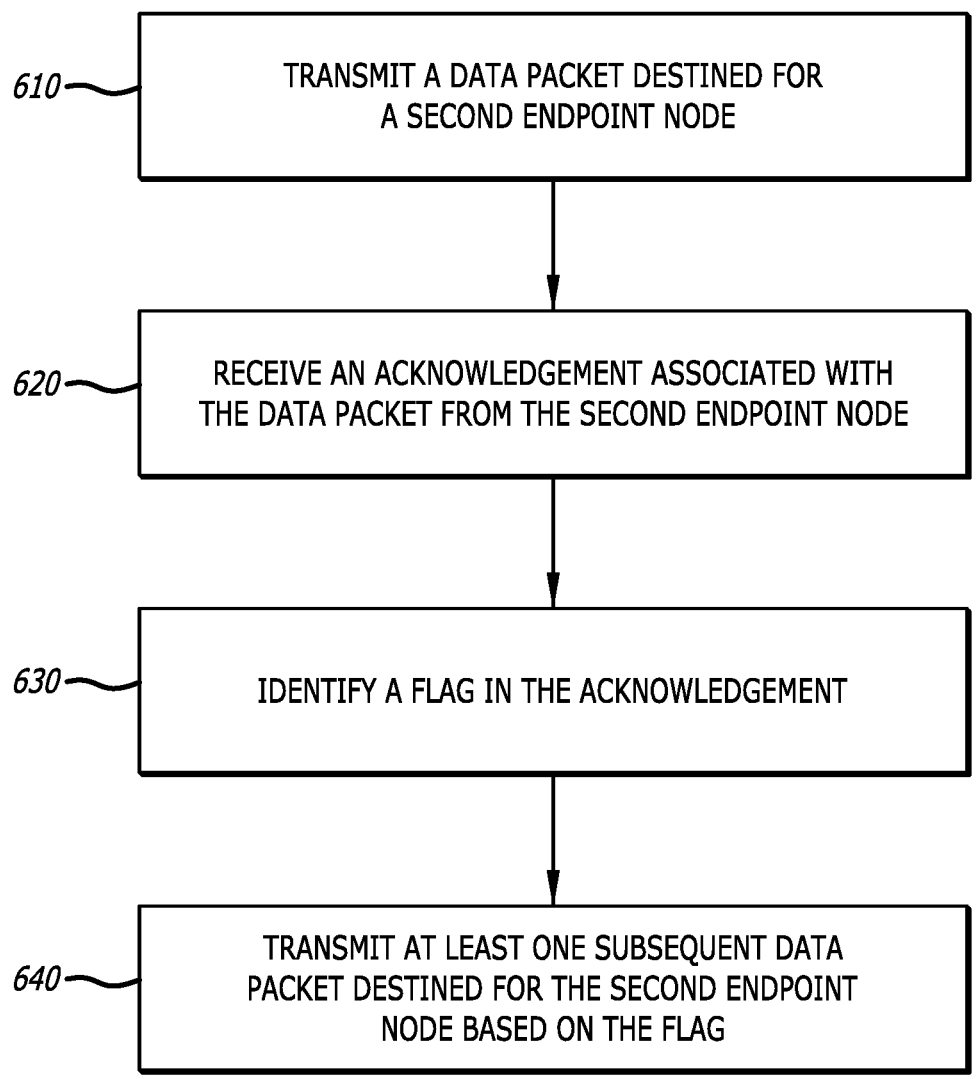
FIG. 6 is a flowchart showing a process for managing data packet transmission in a network in accordance with various embodiments of the disclosure.

Referring to FIG. 6, a flowchart showing a process 600 for managing data packet transmission in a network in accordance with various embodiments of the disclosure is shown. In many embodiments, the process 600 may transmit a data packet destined for a second endpoint node (block 610). The data packet can be originated from a first endpoint node within the network. The data packet may contain various types of data, such as text, images, audio, video, or any combination thereof. The data packet can also be part of a larger data flow, which is a series of related data packets sent between two nodes in the network.

In a number of embodiments, the process 600 can receive an acknowledgement associated with the data packet from the second endpoint node (block 620). The acknowledgement may be a message sent by the second endpoint node to confirm the receipt of the data packet. The acknowledgement can contain various types of data, such as, but not limited to, the status of the data packet, the time of receipt of the data packet, and the quality of the data packet.

In a variety of embodiments, the process 600 can identify a flag in the acknowledgement (block 630). The flag may be a specific bit or set of bits in the header of the acknowledgement. The flag can be associated with an EOPN indication that was inserted into the data packet by the network (in particular, by a network node in the network). The flag may serve as a signal to the first endpoint node that the power usage of the network (or a portion of the network) is exceeding a predetermined power budget.

In some embodiments, the process 600 can transmit at least one subsequent data packet destined for the second endpoint node based on the flag (block 640). The data packet and the at least one subsequent data packet may be associated with the same flow. The process of transmitting the subsequent data packet can involve various steps, such as determining the best path for the subsequent data packet based on the current network conditions, modifying the subsequent data packet to include routing information, and transmitting the subsequent data packet to the second endpoint node.

Although a specific embodiment for a process of managing data packet transmission in a network suitable for carrying out the various steps, processes, methods, and operations described herein is discussed with respect to FIG. 6, any of a variety of systems and/or processes may be utilized in accordance with embodiments of the disclosure. For example, the first endpoint node can implement a feedback-based power management strategy that adjusts the transmission of subsequent data packets based on the flag received in the acknowledgement from the second endpoint node. The elements depicted in FIG. 6 may also be interchangeable with other elements of FIGS. 1-5 and 7-10 as required to realize a particularly desired embodiment.

Figure 7:
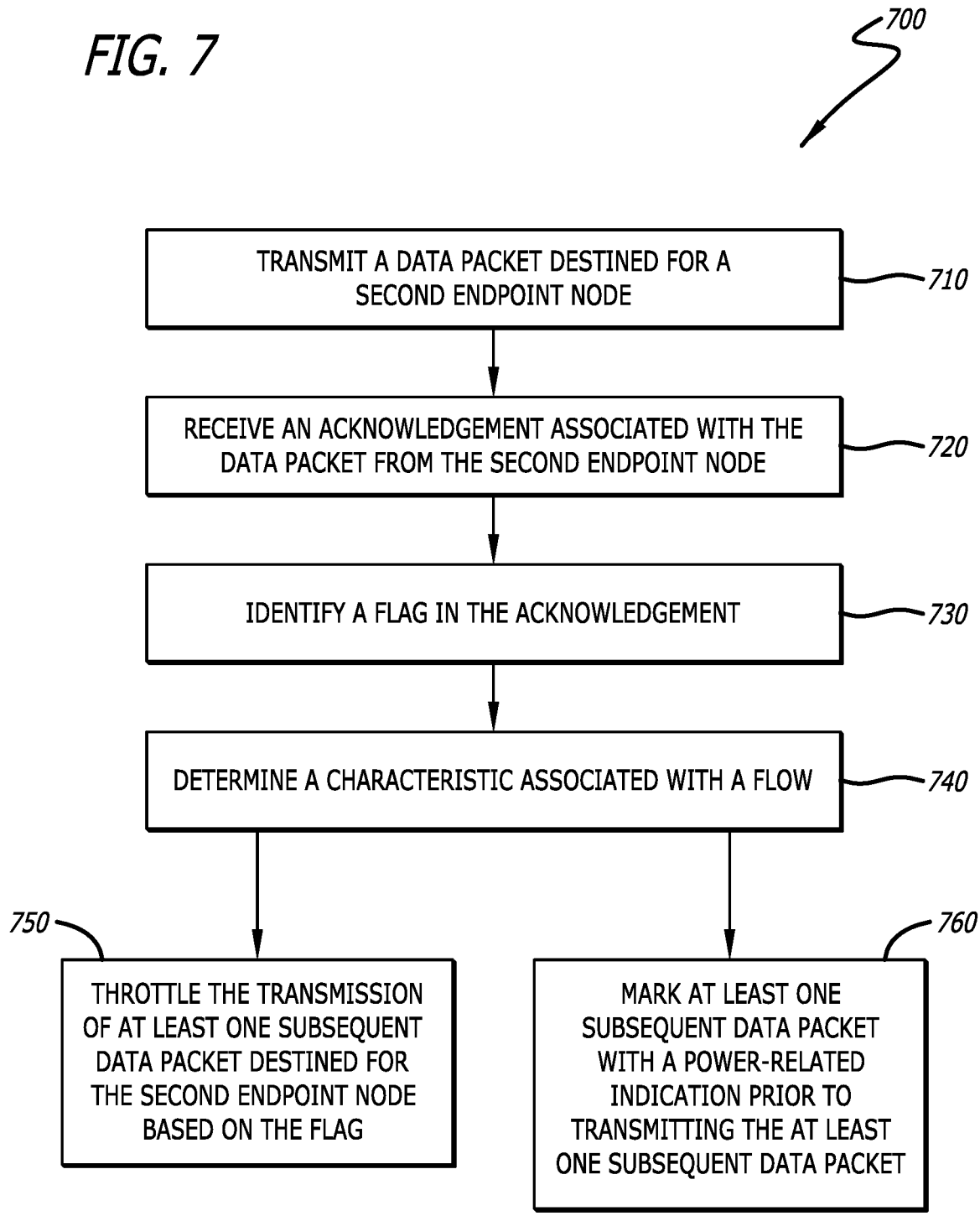
FIG. 7 is a flowchart showing a process for managing data packet transmission in a network in accordance with various embodiments of the disclosure.

Referring to FIG. 7, a flowchart showing a process 700 for managing data packet transmission in a network in accordance with various embodiments of the disclosure is shown. In many embodiments, the process 700 may transmit a data packet destined for a second endpoint node (block 710). The data packet can be originated from a first endpoint node within the network. The data packet may contain various types of data, such as text, images, audio, video, or any combination thereof. The data packet can also be part of a larger data flow, which is a series of related data packets sent between two nodes in the network.

In a number of embodiments, the process 700 can receive an acknowledgement associated with the data packet from the second endpoint node (block 720). The acknowledgement may be a message sent by the second endpoint node to confirm the receipt of the data packet. The acknowledgement can contain various types of data, such as the status of the data packet, the time of receipt of the data packet, and the quality of the data packet.

In a variety of embodiments, the process 700 can identify a flag in the acknowledgement (block 730). The flag may be a specific bit or set of bits in the header of the acknowledgement. The flag can be associated with an EOPN indication that was inserted into the data packet by the network (in particular, by a network node in the network). The flag may serve as a signal to the first endpoint node that the power usage of the network (or a portion of the network) is exceeding a predetermined power budget.

In some embodiments, the process 700 can determine a characteristic associated with a flow (block 740). The characteristic may be any attribute or property of the flow, such as the type of data in the flow, the size of the flow, the source and destination of the flow, the priority of the flow, the power specifications of the flow, and the latency boundary of the flow. The characteristic may also reflect whether the flow is time sensitive and/or can tolerate misordering (of data packets belonging to the flow).

In more embodiments, the process 700 can throttle the transmission of at least one subsequent data packet destined for the second endpoint node based on the flag (block 750). The throttling may be implemented in various ways, such as reducing the transmission rate of the subsequent data packet or delaying the transmission of the subsequent data packet. The throttling can be based on various factors, such as the current network conditions, the power specifications of the subsequent data packet, and the power consumption policies of the network. In additional embodiments, the throttling can include reducing the at least one subsequent data packet to a heartbeat signal so long the network (or a portion thereof) is in the over-power condition.

In further embodiments, the process 700 can mark at least one subsequent data packet with a power-related indication prior to transmitting the at least one subsequent data packet (block 760). The power-related indication may be a specific bit or set of bits in the header of the subsequent data packet. The power-related indication can include a PTE indication and/or an ECMP-exclude indication.

Although a specific embodiment for a process of managing data packet transmission in a network suitable for carrying out the various steps, processes, methods, and operations described herein is discussed with respect to FIG. 7, any of a variety of systems and/or processes may be utilized in accordance with embodiments of the disclosure. For example, the first endpoint node can implement a dynamic throttling mechanism that adjusts the transmission of subsequent data packets based on the flag in the acknowledgement and the characteristic of the flow. The elements depicted in FIG. 7 may also be interchangeable with other elements of FIGS. 1-6 and 8-10 as required to realize a particularly desired embodiment.

Figure 8:
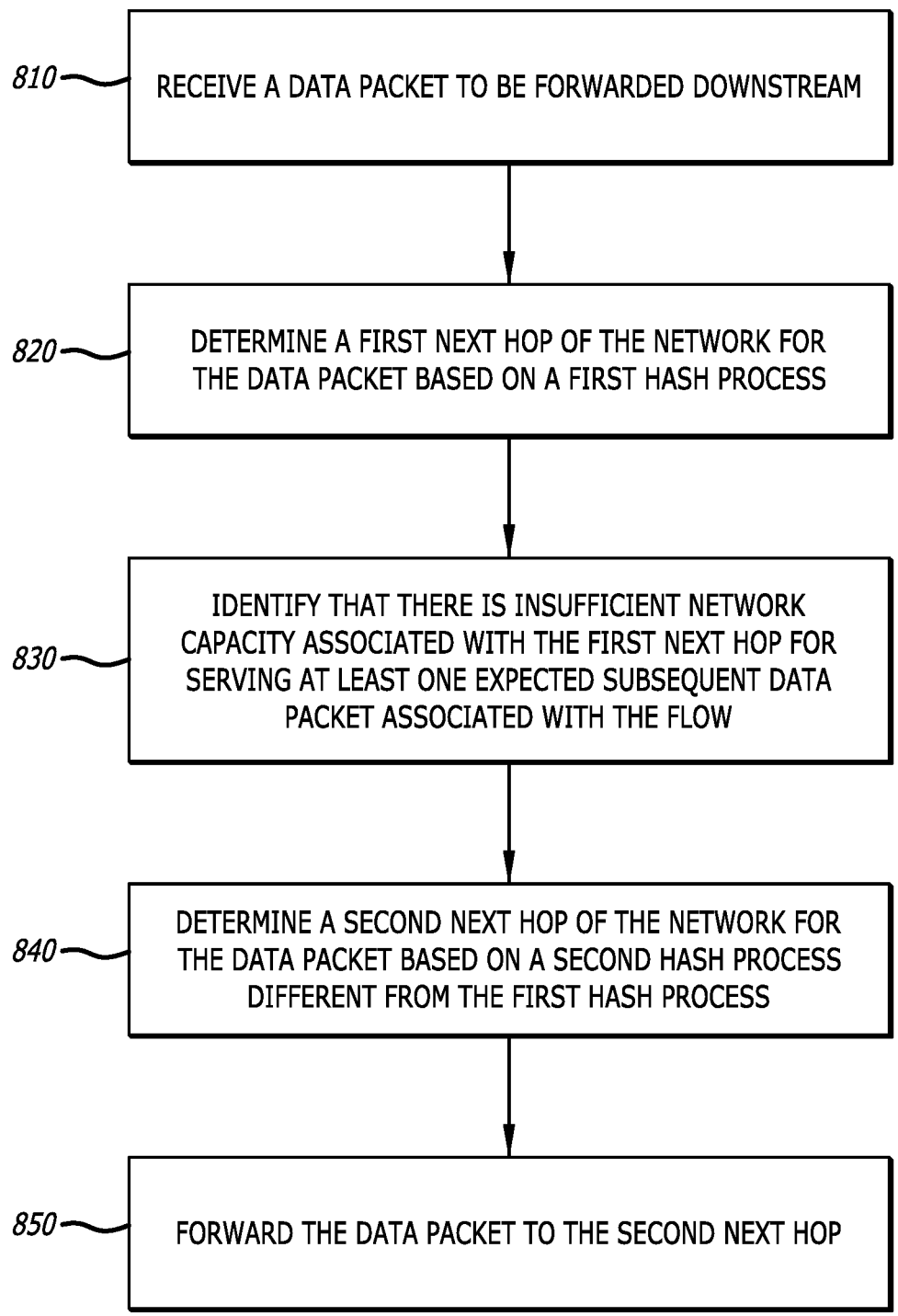
FIG. 8 is a flowchart showing a process for managing data packet forwarding in a network in accordance with various embodiments of the disclosure.

Referring to FIG. 8, a flowchart showing a process 800 for managing data packet forwarding in a network in accordance with various embodiments of the disclosure is shown. In many embodiments, the process 800 may receive a data packet to be forwarded downstream (block 810). The data packet can be associated with a flow and can be originated from a first endpoint node within the network. The data packet may contain various types of data, such as text, images, audio, video, or any combination thereof. The data packet can also be part of a larger data flow, which is a series of related data packets sent between two nodes in the network.

In a number of embodiments, the process 800 can determine a first next hop of the network for the data packet based on a first hash process (block 820). The first hash process may be a standard hash process for ECMP handling. The first hash process may involve generating a hash value based on which the next hop can be selected from a list of available next hops.

In a variety of embodiments, the process 800 can identify that there is insufficient network capacity associated with the first next hop for serving at least one expected subsequent data packet associated with the flow (block 830). The identification may be based on various factors, such as the current network conditions, the capacity of the first next hop, and the expected size and frequency of the subsequent data packets. The process may monitor the network conditions and the capacity of the first next hop in real-time, and use the data to predict whether the first next hop will have sufficient capacity to serve the expected subsequent data packets.

In some embodiments, the process 800 can determine a second next hop of the network for the data packet based on a second hash process different from the first hash process (block 840). The second hash process may be different from the standard hash process for ECMP handling. In more embodiments, the second hash process can take into account different factors than the first hash process, such as the current network conditions, the destination of the data packet, and the routing information in the data packet. The second hash process may involve applying a different hash function to the destination address of the data packet to generate a different hash value based on which the second next hop may be selected from the list of available next hops.

In additional embodiments, the process 800 can forward the data packet to the second next hop (block 850). The process of forwarding the data packet may involve various steps, such as, but not limited to, modifying the data packet to include routing information for the second next hop, and transmitting the data packet to the second next hop. A network interface associated with the second next hop may be used to transmit the data packet.

Although a specific embodiment for a process of managing data packet forwarding in a network suitable for carrying out the various steps, processes, methods, and operations described herein is discussed with respect to FIG. 8, any of a variety of systems and/or processes may be utilized in accordance with embodiments of the disclosure. For example, the network node can implement a dynamic routing mechanism that adjusts the next hop for the data packet based on the network capacity and the expected subsequent data packets. The elements depicted in FIG. 8 may also be interchangeable with other elements of FIGS. 1-7, 9, and 10 as required to realize a particularly desired embodiment.

Figure 9:
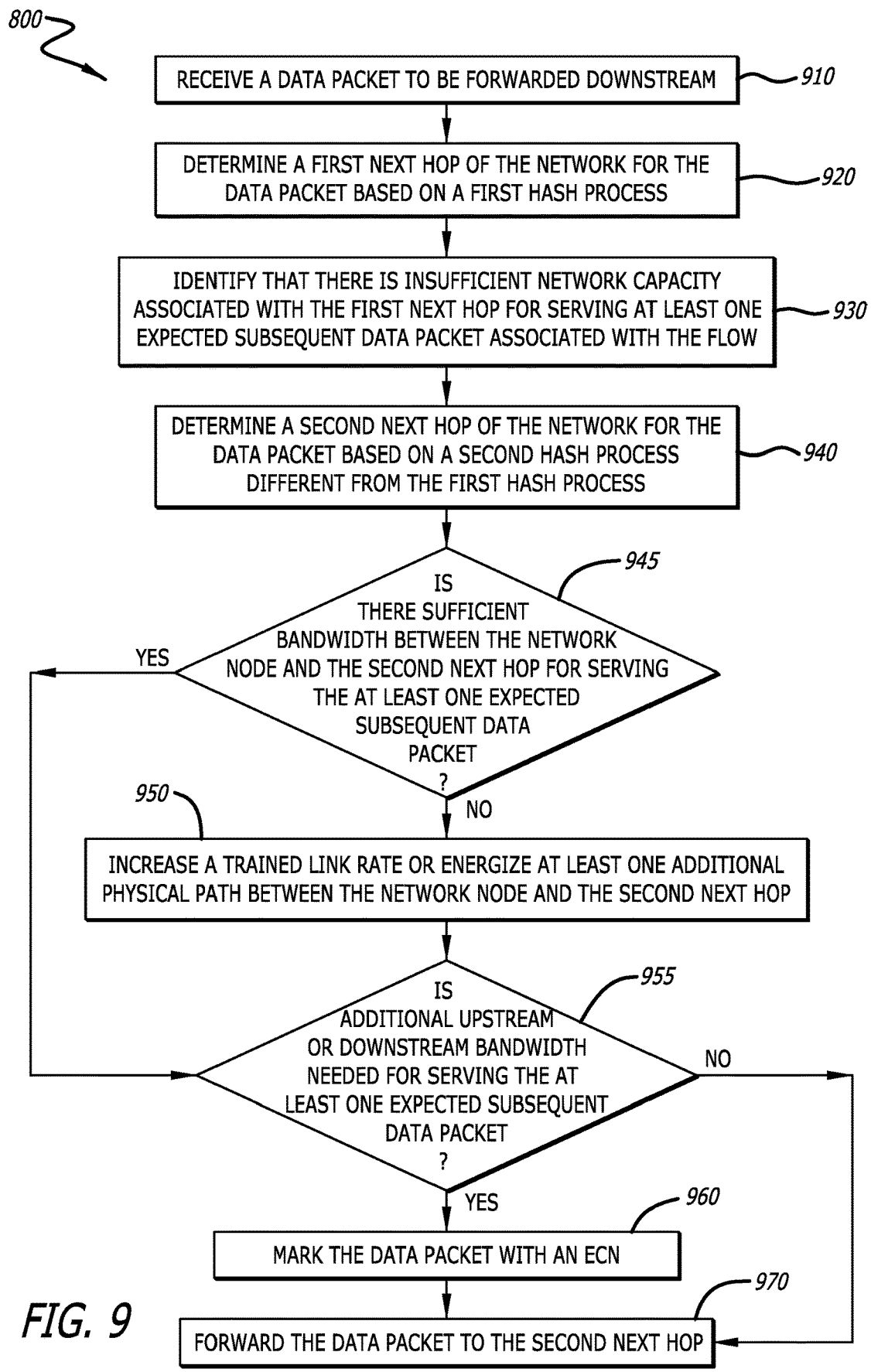
FIG. 9 is a flowchart showing a process for managing data packet forwarding in a network in accordance with various embodiments of the disclosure.

Referring to FIG. 9, a flowchart showing a process 900 for managing data packet forwarding in a network in accordance with various embodiments of the disclosure is shown. In many embodiments, the process 900 may receive a data packet to be forwarded downstream (block 910). The data packet can be originated from a first endpoint node within the network. The data packet may contain various types of data, such as text, images, audio, video, or any combination thereof. The data packet can also be part of a larger data flow, which is a series of related data packets sent between two nodes in the network.

In a number of embodiments, the process 900 can determine a first next hop of the network for the data packet based on a first hash process (block 920). The first hash process may be a standard hash process for ECMP handling. The first hash process may involve generating a hash value based on which the next hop can be selected from a list of available next hops.

In a variety of embodiments, the process 900 can identify that there is insufficient network capacity associated with the first next hop for serving at least one expected subsequent data packet associated with the flow (block 930). The identification may be based on various factors, such as, but not limited to, the current network conditions, the capacity of the first next hop, and the expected size and frequency of the subsequent data packets. The process can monitor the network conditions and the capacity of the first next hop in real-time, and use this data to predict whether the first next hop will have sufficient capacity to serve the expected subsequent data packets.

In some embodiments, the process 900 can determine a second next hop of the network for the data packet based on a second hash process different from the first hash process (block 940). The second hash process may be different from the standard hash process for ECMP handling. In more embodiments, the second hash process can take into account different factors than the first hash process, such as the current network conditions, the destination of the data packet, and the routing information in the data packet. The second hash process may involve applying a different hash function to the destination address of the data packet to generate a different hash value based on which the second next hop may be selected from the list of available next hops.

In additional embodiments, the process 900 can determine if there is sufficient bandwidth between the network node and the second next hop for serving the at least one expected subsequent data packet (block 945). In further embodiments, in response to determining that there is sufficient bandwidth, the process 900 can determine if additional upstream or downstream bandwidth is needed for serving the at least one expected subsequent data packet. However, in still more embodiments, if there is not sufficient bandwidth, the process 900 can increase a trained link rate or energize at least one additional physical path between the network node and the second next hop.

In still further embodiments, when there is not sufficient bandwidth, the process 900 can increase a trained link rate or energize at least one additional physical path between the network node and the second next hop (block 950). This may involve adjusting the settings of the network node or the second next hop, or activating additional network resources. The process can use a network management system to control the trained link rate and/or the physical paths.

In still additional embodiments, the process 900 can determine if additional upstream or downstream bandwidth is needed for serving the at least one expected subsequent data packet (block 955). In some more embodiments, in response to determining that additional bandwidth is needed, the process 900 can mark the data packet with an ECN. However, in certain embodiments, if additional bandwidth is not needed, the process 900 can forward the data packet to the second next hop.

In yet more embodiments, when additional bandwidth is needed, the process 900 can mark the data packet with an ECN (block 960). The ECN may be a specific bit or set of bits in the header of the data packet. The ECN can serve as a signal to the other network nodes in the network that the network is experiencing congestion. Accordingly, network capacity downstream and/or upstream may be promptly waken up based on the ECN.

In still yet more embodiments, the process 900 can forward the data packet to the second next hop (block 970). The process of forwarding the data packet may involve various steps, such as, but not limited to, modifying the data packet to include routing information for the second next hop, and transmitting the data packet to the second next hop. The process can use a network interface associated with the second next hop to transmit the data packet.

Although a specific embodiment for a process of managing data packet forwarding in a network suitable for carrying out the various steps, processes, methods, and operations described herein is discussed with respect to FIG. 9, any of a variety of systems and/or processes may be utilized in accordance with embodiments of the disclosure. For example, the network node can be equipped with a machine learning process that learns from the network conditions and the expected subsequent data packets to dynamically adjust the link rate or activate additional physical paths. The elements depicted in FIG. 9 may also be interchangeable with other elements of FIGS. 1-8 and 10 as required to realize a particularly desired embodiment.

Figure 10:
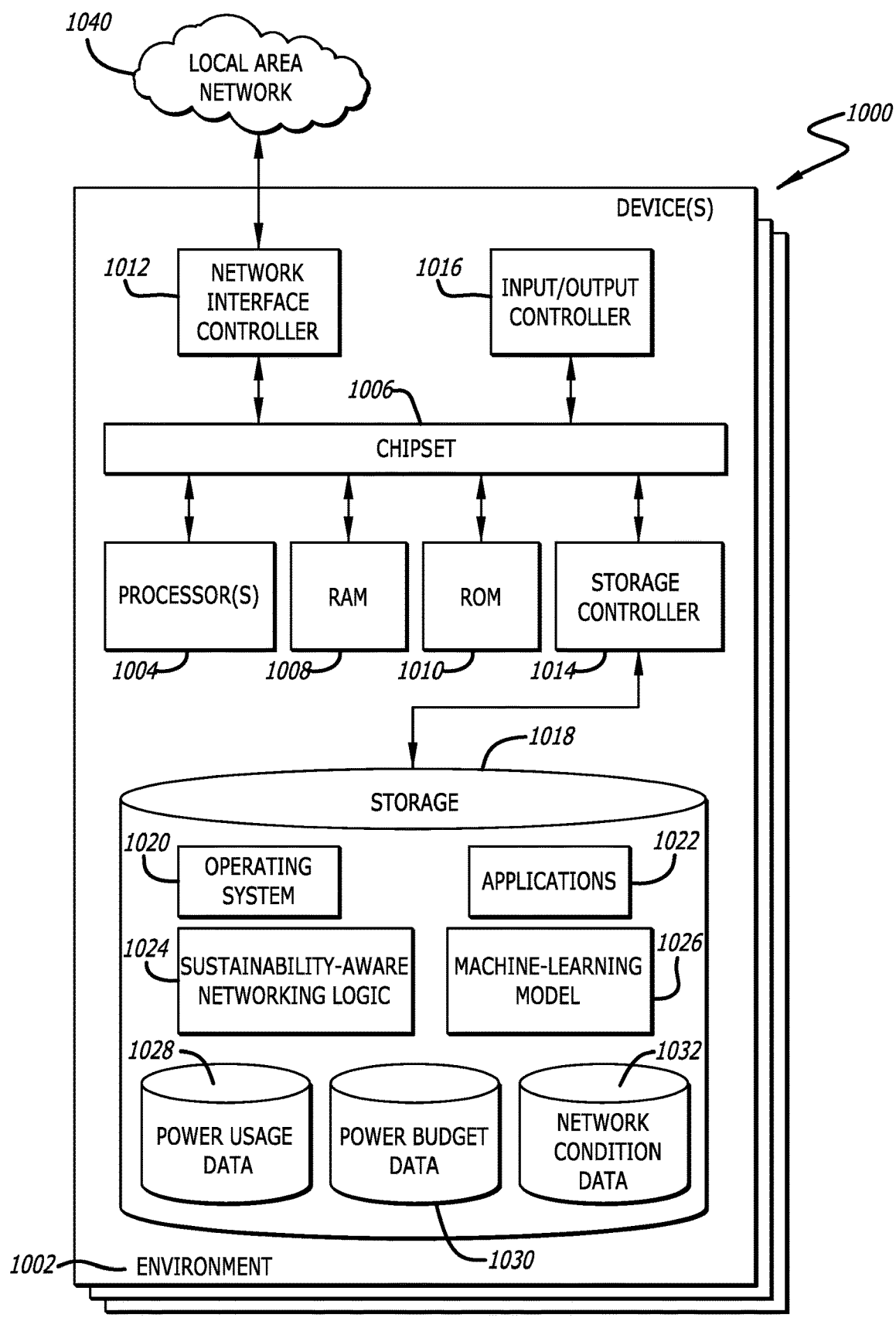
FIG. 10 is a conceptual block diagram for one or more devices capable of executing components and logic for implementing the functionality and embodiments described above.

Referring to FIG. 10, a conceptual block diagram for one or more devices 1000 capable of executing components and logic for implementing the functionality and embodiments described above is shown. The embodiment of the conceptual block diagram depicted in FIG. 10 can illustrate a conventional server computer, workstation, desktop computer, laptop, tablet, network appliance, e-reader, smartphone, or other computing device, and can be utilized to execute any of the application and/or logic components presented herein. The device 1000 may, in some examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In additional embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a network interface card ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for example, store an operating system 1020, applications 1022, power usage data 1028, power budget data 1030, and network condition data 1032, which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

For example, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In various embodiment, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-9. In more embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10 and can include other components that are not explicitly shown in FIG. 10, or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In many embodiments, the device 1000 can include a sustainability-aware networking logic 1024. The sustainability-aware networking logic 1024 may optimize data packet routing based on energy efficiency metrics. The sustainability-aware networking logic 1024 can dynamically adjust the routing paths, link rates, and physical paths activation based on real-time network conditions, power consumption data, and predefined sustainability goals, thereby reducing the overall energy footprint of the network operations.

In a number of embodiments, the storage 1018 can include power usage data 1028. The power usage data 1028 may be a set of data points collected from various components of the network, such as routers, switches, and servers, that indicate the amount of power consumed during their operation. The power usage data 1028 can be collected in real-time using embedded sensors or power monitoring systems, and can be used to analyze and optimize the energy efficiency of the network.

In various embodiments, the storage 1018 can include power budget data 1030. The power budget data 1030 may specify the predefined or dynamically allocated amount of power that is available for the network operations. The power budget data can be used by the network management system to optimize the distribution of power among various network components, ensuring that the network operates within its power budget while maximizing performance and efficiency.

In still more embodiments, the storage 1018 can include network condition data 1032. The network condition data 1032 may be a collection of real-time metrics that reflect the current state of the network, including factors such as, but not limited to, network traffic, bandwidth usage, latency, and packet loss rates. The network condition data 1032 can be gathered through network monitoring tools and used by the network management system to make informed decisions about data packet routing, bandwidth allocation, and other network operations.

Finally, in many embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026. The ML model 1026 may be configured to utilize the various data to optimize the routing paths, link rates, and physical paths activation in a way that maximizes the energy efficiency of the network operations.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network node, comprising:
   a processor;
   at least one network interface controller configured to provide access to a network; and
   a memory communicatively coupled to the processor, wherein the memory comprises a sustainability-aware networking logic that is configured to:
   receive a data packet, the data packet being originated from a first endpoint node;
   determine whether a power measurement for at least a portion of the network exceeds a predetermined power budget;
   mark the data packet with an explicit over-power notification (EOPN) indication in response to determining that the power measurement exceeds the predetermined power budget; and forward the marked data packet to a next hop in the network.

2. The network node of claim 1, wherein the EOPN indication includes an EOPN bit, and the EOPN bit is included in a header of the marked data packet.

3. The network node of claim 1, wherein the sustainability-aware networking logic is further configured to receive at least one subsequent data packet, and wherein the at least one subsequent data packet is originated from the first endpoint node, and the data packet and the at least one subsequent data packet are associated with a same flow.

4. The network node of claim 3, wherein the at least one subsequent data packet includes a power-based throttle eligible (PTE) indication, and wherein the sustainability-aware networking logic is further configured to throttle the at least one subsequent data packet in forwarding the at least one subsequent data packet based on the PTE indication.

5. The network node of claim 4, wherein the PTE indication includes a PTE bit included in a header of the at least one subsequent data packet.

6. The network node of claim 3, wherein the at least one subsequent data packet includes an equal-cost multi-path routing (ECMP)-exclude indication, and wherein the sustainability-aware networking logic is further configured to forward, based on the ECMP-exclude indication, the at least one subsequent data packet to a first next hop that is different from a second next hop as determined based on an ECMP-associated hash function.

7. The network node of claim 6, wherein the ECMP-exclude indication includes an ECMP-exclude bit included in a header of the at least one subsequent data packet.

8. The network node of claim 3, wherein the at least one subsequent data packet includes at least one heartbeat data packet.

9. The network node of claim 1, wherein the predetermined power budget is based at least in part on a present power source or power source mix.

10. An endpoint node, comprising:
a processor;
at least one network interface controller configured to provide access to a network; and
a memory communicatively coupled to the processor, wherein the memory comprises a sustainability-aware networking logic that is configured to:
transmit a data packet destined for a second endpoint node;
receive an acknowledgement associated with the data packet from the second endpoint node;
identify a flag in the acknowledgement, the flag being associated with an explicit over-power notification (EOPN) indication inserted into the data packet by the network; and
transmit at least one subsequent data packet destined for the second endpoint node based on the flag, the data packet and the at least one subsequent data packet being associated with a same flow.

11. The endpoint node of claim 10, wherein to transmit the at least one subsequent data packet, the sustainability-aware networking logic is further configured to throttle the at least one subsequent data packet.

12. The endpoint node of claim 10, wherein the at least one subsequent data packet includes at least one heartbeat data packet.

13. The endpoint node of claim 10, wherein the sustainability-aware networking logic is further configured to mark the at least one subsequent data packet with a power-related indication prior to transmitting the at least one subsequent data packet.

14. The endpoint node of claim 13, wherein the at least one subsequent data packet is marked with the power-related indication based at least in part on a characteristic of the same flow.

15. The endpoint node of claim 13, wherein the power-related indication includes at least one indication bit included in a header of the at least one subsequent data packet.

16. The endpoint node of claim 13, wherein the power-related indication includes a power-based throttle eligible (PTE) indication.

17. The endpoint node of claim 13, wherein the power-related indication includes an equal-cost multi-path routing (ECMP)-exclude indication.

18. A network node, comprising:
a processor;
at least one network interface controller configured to provide access to a network; and
a memory communicatively coupled to the processor, wherein the memory comprises a routing logic that is configured to:
receive a data packet to be forwarded downstream, the data packet being associated with a flow;
determine a first next hop of the network for the data packet based on a first hash process;
identify that there is insufficient network capacity associated with the first next hop for serving at least one expected subsequent data packet associated with the flow;
determine a second next hop of the network for the data packet based on a second hash process different from the first hash process; and
forward the data packet to the second next hop.

19. The network node of claim 18, wherein the routing logic is further configured to increase a trained link rate between the network node and the second next hop.

20. The network node of claim 18, wherein the routing logic is further configured to energize at least one additional physical path between the network node and the second next hop.

* * * * *